RADIO CIRCUIT IN WHICH THE VACUUM TUBE FIRES FOR EACH ALTERNATE POSITIVE CYCLE OF THE GRID SWING

Filed Aug. 12, 1952

INVENTORS
JULIUS W. MANN
GEORGE F. RUSSELL
BY
Mann & Liddy
ATTORNEYS

INVENTORS
JULIUS W. MANN
GEORGE F. RUSSELL
BY
Munn & Liddy
ATTORNEYS

DIAGRAM SHOWING Y-CREST,
POINT OF GREATEST ENERGY EXCHANGE
1/8 WAVE LENGTH FROM E°.

INVENTORS
JULIUS W. MANN
GEORGE F. RUSSELL
BY Munn + Liddy
ATTORNEYS

United States Patent Office 2,777,022
Patented Jan. 8, 1957

2,777,022

RADIO CIRCUIT IN WHICH THE VACUUM TUBE FIRES FOR EACH ALTERNATE POSITIVE CYCLE OF THE GRID SWING

Julius W. Mann and George F. Russell, Tacoma, Wash.

Application August 12, 1952, Serial No. 303,918

2 Claims. (Cl. 200—36)

An object of our invention is to provide a radio circuit that is especially designed to operate at a fixed frequency. In the radio circuits disclosed in our patents (1) on a variable grid circuit, Patent No. 2,382,435, issued August 14, 1945; and (2) on a composite radio frequency inductance, Patent No. 2,453,241, issued November 9, 1948; we show a coaxial inductance in which the current antinodal positions of the plate, grid and output or work circuits coincide in a common area in the composite inductance means. The two components of such a composite means are shown in a coil form in Patent No. 2,382,435; and in a straight line form as well as coil form in Patent No. 2,453,241.

We found that in the radio circuits of the above mentioned patents, the grid circuit necessarily had some line and electrical length when the R. F. path was provided through the bridge of Patent No. 2,382,435, or through the adjustable taps of Patent No. 2,453,241. Under some conditions of load, the grid circuit would become dominant as the maximum loading of the circuit was approached and then would suddenly shift the entire oscillator into another mode and frequency which in turn would drop off or spill the output or work load circuit and prevent it from effectively producing the most output of energy.

We further discovered that the best operation of the radio circuits in the two patents referred to above was accomplished when the line length from the current antinodal position in the composite inductance to the grids in the tubes was electrically approximately one-eighth of the radio frequency standing wave formed in the total of the oscillating circuit. In other words, the grid circuit approached having a natural period of vibration or wave frequency, equal to the second harmonic of the fundamental frequency of the oscillator to which it belonged. By bending the inductances of the circuit in such a manner as to bring the "K" spot areas, later described, of the inductance portion of the circuit close to the grid terminals of the tubes (approximately one-eighth of an electrical wave length away from the center of the composite inductance means or common current antinodal position), then the areas of maximum energy conversion in the inductance portions of the circuit would be relatively so placed and so disposed. The grid circuit could thereby be forced to operate on the second harmonic of the fundamental frequency of the output or work inductance of the circuit, and the radio circuit would become substantially more stable.

A further object of our invention is to provide a radio circuit of the type described in which the vacuum tube fires for each alternate positive cycle of the grid swing rather than for each positive swing of the grid, details of which will be more fully explained.

Other objects and advantages will appear in the following specification, and novel features of the device will be particularly pointed out in the appended claims.

Our invention is illustrated in the accompanying drawings forming a part of this application, in which.

Figure 4:
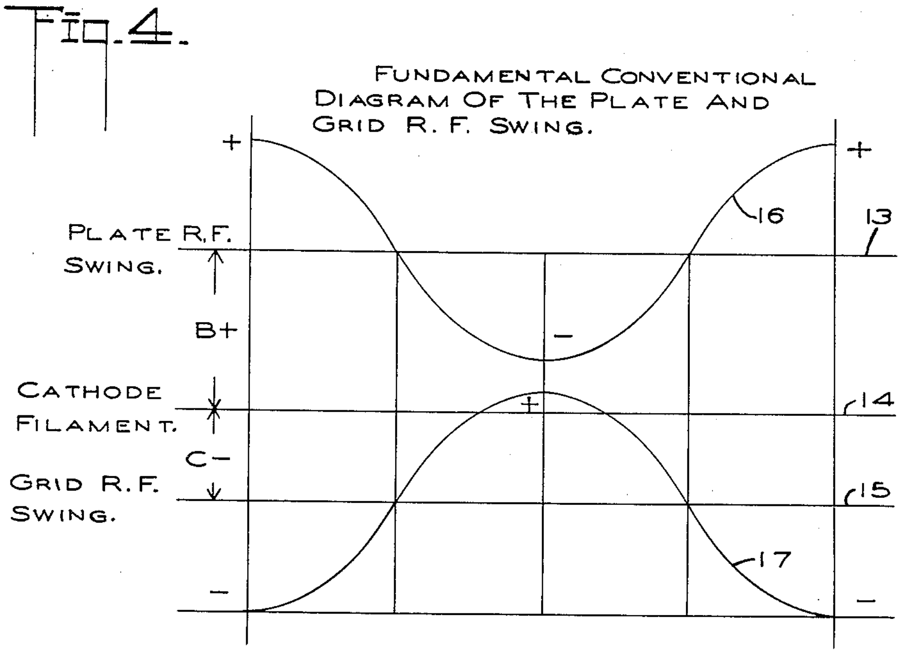
Figure 5:
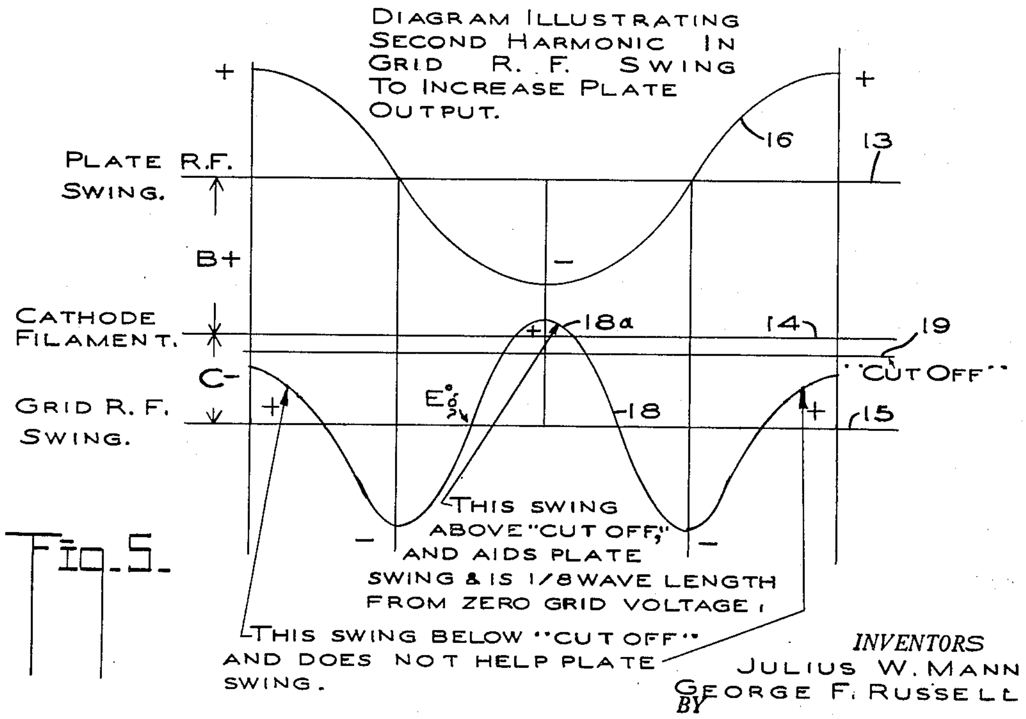
Figure 6:
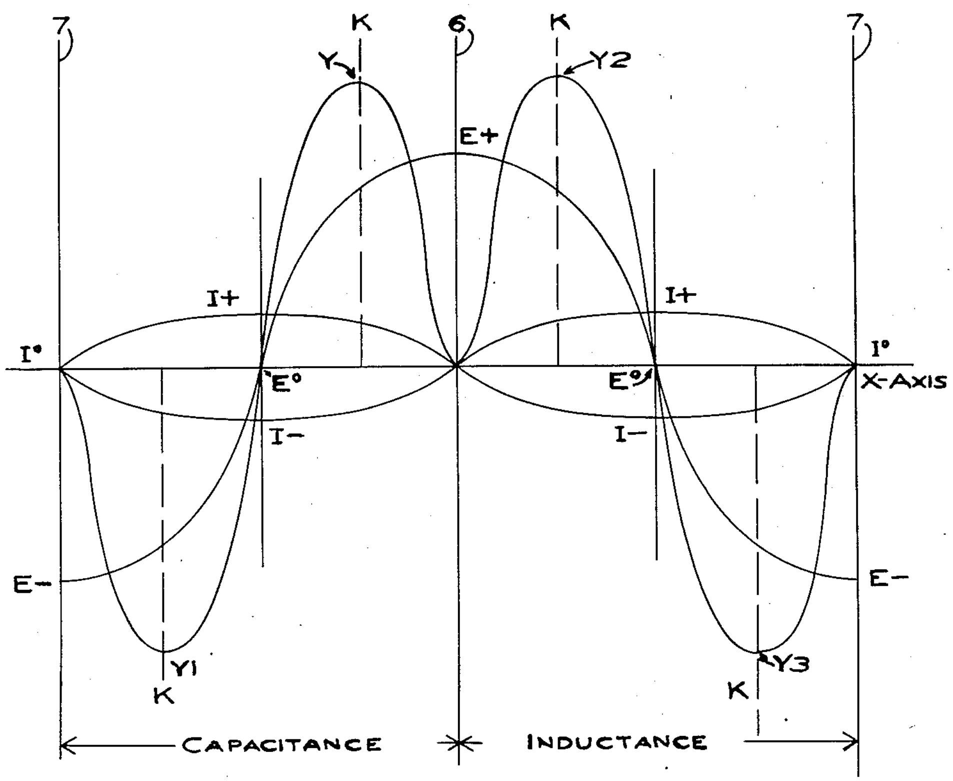

Figure 4 is a fundamental conventional diagram of the plate R. F. swing in relation to the grid R. F. swing;

Figure 5 is a diagram illustrating the second harmonic in the grid R. F. swing in its relation to the plate R. F. swing; and Figure 6 is a diagram illustrating the point of greatest energy exchange as being one-eighth electrical wave length each side of the current antinodes, in a standing wave system.

While we have shown only the preferred form of our invention, it should be understood that various changes or modifications may be made within the scope of the appended claims without departing from the spirit and scope of the invention.

Figure 1:
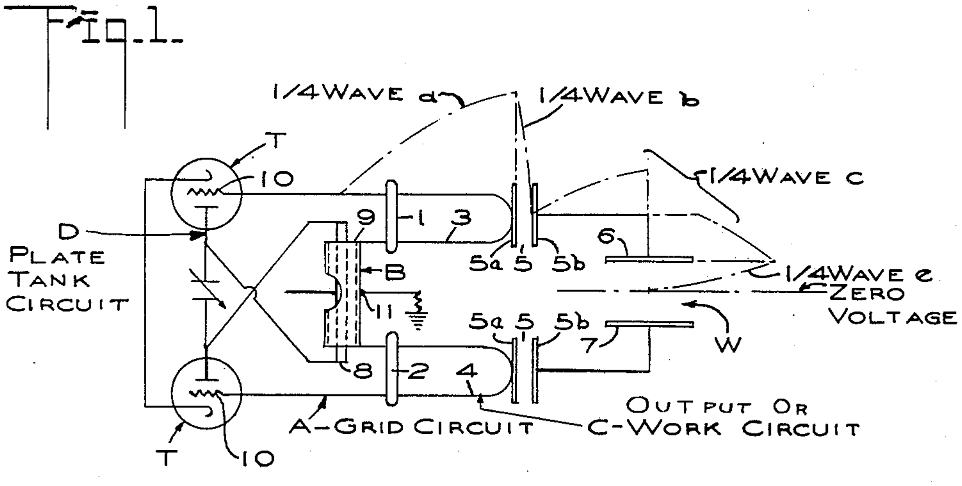
Figure 1 is a wiring diagram of a radio circuit somewhat similar to the one shown in Figure 3 in our Patent No. 2,382,435, and Figure 4 in our Patent No. 2,453,241, and illustrates the shorting bars in the grid circuit to obtain a variable frequency.

In carrying out our invention, we illustrate in Figure 1, the fundamental circuit disclosed and claimed in our Patent 2,506,158, on a single standing wave radio circuit, issued May 2, 1950; and also shown in our Patent 2,382,435 on a variable grid circuit, issued August 14, 1945. In both patents a variable condenser is included in the plate tank circuit for tuning this circuit to the desired frequency. It was found that the grid circuit could be forced to approach a natural frequency period equal to the second harmonic of the fundamental frequency of the oscillator to which it belonged when the grid was physically connected to the work circuit at approximately an electrical one-eighth wave length point from the central current antinodal position in the composite inductance.

In Figure 1 we show our patented radio circuit with the sliding shorting bars 1 and 2 placed in the inductance 3 and 4 to the grid circuit indicated generally at A. We indicate in the wiring diagram of Figure 1, several successive quarter waves extending from the current antinodal position on the composite inductance B to the zero voltage center of the work or load receiving condenser W. It will be seen that a quarter wave *a* extends from the current antinodal position on the composite inductance B to the plate **5*a* of the fixed condenser 5**. A second succeeding quarter wave *b* extends between the plates **5*a* and 5*b* of the fixed condenser 5**. A third succeeding quarter wave *c* extends from approximately the plate **5*b* of the fixed condenser 5 to the plate 6** of the work or load receiving condenser W, and a fourth consecutive quarter wave *e* extends from the plate 6 to the center of the condenser W, i. e., one-half the distance between the plates 6 and 7 of the condenser W.

Figure 2:
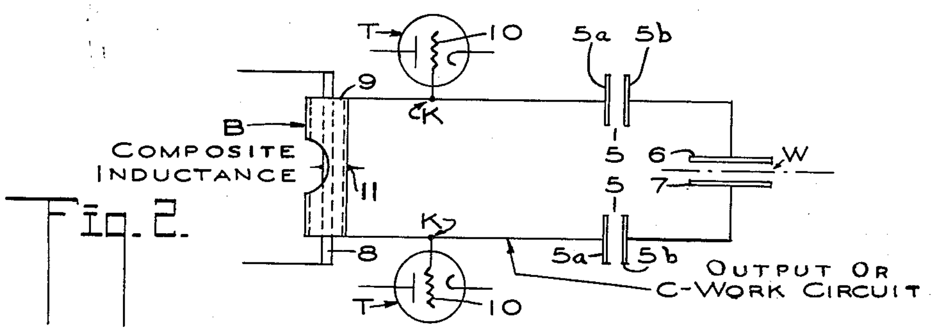
Figure 2 illustrates the ideal places to position the grids of the tubes in the plate work circuit of the wiring diagram.
Figure 3:
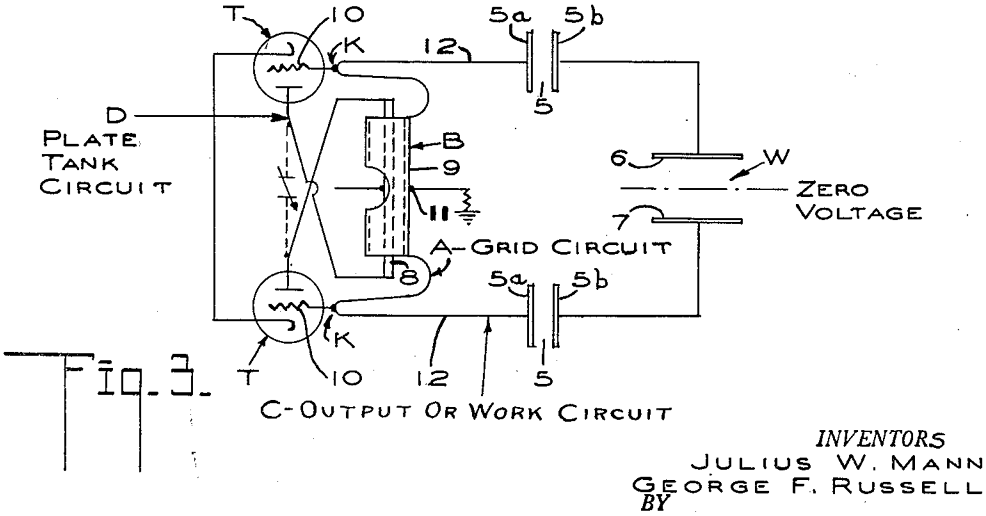
Figure 3 shows the radio circuit with the grids of the tubes connected to the work output circuit, one-eighth of an electrical wave length from the common center point of the composite inductance.

The grid circuit A forms a physical part for at least a portion of the electrical length of the work or output circuit indicated generally at C. The plate tank circuit, indicated generally at D is so disposed in relation to the grid circuit A, in Figure 3, as to combine in a common boundary area their respective radio frequency current antinodal positions, by means of a mechanism such as our concentric inductance or other means. Such a composite radio frequency inductance is disclosed and claimed in our Patent 2,453,241, issued November 9, 1948. The straight inductance portion 8 of such a composite inductance B, Figure 3, forms a physical part of the plate tank circuit D, and may be enclosed within a tubular straight inductance portion 9, that forms a physical part of the grid circuit A and also the output or work circuit C. The tube 9 is spaced from the rod or tube 8 so as to provide air insulation between the two. We do not wish to be confined to the straight line inductance elements 8 and 9 because they could be in the form of a coil as illustrated in Figures 1, 2 and 3 of our Patent 2,453,241 or otherwise. Rubber or other insulating material could be used between the two inductance elements 8 and 9 rather than air if it is found desirable to do so.

We show the sliding shorting bars 1 and 2 in Figure 1 to indicate that the combined grid and output or work circuit inductance could be changed at will. It was found when working with the radio circuit of Figure 1, that the best results were obtained when the grids 10 of the vacuum tubes T were physically connected at a point corresponding to a distance from the center of the R. F. current antinodal positions 11 of the plate, grid and output or work circuits, equal electrically, but not necessarily physically to one-eighth of the dominant wave length of the whole circuit. This point is indicated at a position generally in the area marked K in Figure 2, where only the composite inductance B and the output or work circuit C are shown but not the details of plate tank connection.

In the old design disclosed in our radio circuit Patent 2,506,158, the grid system necessarily had some line length when the path for the radio frequency waves was provided through the shorting bars 1 and 2 of Figure 1. Under some conditions of load, the grid circuit A would become dominant as maximum loading of the output or work circuit C was approached, and suddenly the grid circuit would force the dominant wave length into another mode or frequency which in turn would drop off or spill the previously tuned in output or work load. This required returning of the radio circuit. It was found that when the grid connection was made in an area which approximated one-eighth of an electrical wave length of the fundamental from the midpoint of the composite inductance B, the radio circuit became stable and the grid circuit could not then force or cause a shift of the entire frequency of oscillation into another mode during the loading of the output or work circuit. Figure 2 illustrates the grids 10 of the tubes T physically connected to the K areas in the work circuit C, with as short a physical connection between the K spots of the fundamental R. F. oscillating circuit and the grids as it is possible to effect.

Figure 3 shows a wiring diagram of a radio circuit employing our new principle. Here the lines 12 in the output or work load circuit C are bent in such a manner as to bring the K spot positions in the load or output line close to the terminals of the grids 10. The remainder of the radio circuit is the same as in Figure 1 and as in our patents above referred to, and similar parts will be given like reference numerals or letters. We have found that the K spot areas are boundaries where maximum energy conversion takes place in the output load inductance, from kinetic to potential energy and vice versa.

Figure 6 is a graph illustrating the two energy crests Y and Y1 in the capacitance portion of the dominant full standing wave, and the two energy crests Y2 and Y3 in the inductance portion of the full standing R. F. wave when the voltage E and the current I approach 90° out of phase. The four power curves Y, Y1, Y2, and Y3, inclusive, each occupies substantially one-fourth the electrical length of a full electrical wave length which positions the K spot areas or power crests one-eighth of an electrical full wave length from current antinodal positions, both in inductance and capacitance portions.

It will be seen from Figure 6, that the half wave inductance portion in Figure 3 from *5a* through 9 to *5a* on the opposite leg has two points K in the inductance of greatest power dissipation and these each fall at areas electrically approximately one-eighth wave length from the zero voltage E° position in the inductance portion of the graph, the position generally indicated in Figure 3 by the numeral 11. The two vertical dash lines in the inductance portion of the graph are labelled K and correspond to the K spots or areas in Figure 3. We have found that the conversion of potential to kinetic energy and vice versa is maximum at the crest of the power peaks generally described as the K spot areas.

Figure 4 illustrates a fundamental and conventional diagram of the plate and grid radio frequency swing while Figure 5 illustrates the use of the second harmonic for the grid swing which sharpens the peak of the R. F. grid swing positive above cut off, and thereby enhances performance. Referring to Figure 4, we have the horizontal line 13 representing the positive D. C. anode voltage position above cathode. The next horizontal line 14 in Figure 4 represents the cathode filaments while the next line 15 represents the grids average D. C. negative charge compared to ground and its zero radio frequency charge. A single sine wave 16 indicates the R. F. plate swing from positive to negative and back to positive again but generally above ground. Another sine wave 17 indicates the R. F. grid swing from negative to positive and back to negative again. The grid, of course, except when above cut off, is negatively biased relative to cathode so it will prevent any appreciable electron flow from cathode to anode and therefore no plate current flows.

In Figure 5, the same sine wave 16 for the plate is shown, but the sine wave 18 for the grid is a second harmonic rather than the sine wave of the fundamental as 17 in Figure 4. The second harmonic loop **18*a* in Figure 5 extends above cut off and therefore the grid 10 will become sufficiently R. F. positive to permit electrons to flow from the cathode to anode, thus allowing a flow of plate current. The grid circuit will have a natural period of vibration equal, generally, to the second harmonic of the fundamental frequency of the oscillator as a whole to which it belongs, and of which it is a part. The grids 10 of the tubes T in Figures 2 and 3 are placed and connected at the spots K areas, which have been previously described. This will result in an increased effective use of the K spot for grid drive and the tube will fire each alternate R. F. positive cycle of the grid swing instead of on each such single R. F. swing, which would occur if the grid circuit made its frequency the same as the total dominant frequency. Both the plate radio frequency swing and the grid radio frequency swing on fundamental and second harmonic respectively will rise together and maximum results will be realized without any tendency for the grid circuit to become dominant as the tube fires and as maximum current near top tube rating is approached nor will the circuit suddenly go into another mode and frequency which would spill the load, since the grid can now never become dominant. The lines 14 and 19** in Figure 5 represent the cathode filaments and the tube cut off respectively.

To describe further, Figure 5, and the difference in positive R. F. grid swing on the positive side of line 15, at different position during the cycle, it will be observed, that we have by using the second harmonic created a unique and somewhat self-regulating grid swing in that, when negative R. F. plate swing, with reference to line 13, is maximum, this negative R. F. state of the anode will tend to induce opposite positive R. F. charge in the adjacent grid structure, thus augmenting the grid R. F. rise above cut off. On the other hand, when the plate R. F. charge swings to the maximum positive with respect to the line 13, the second harmonic swing of grid R. F. charge will be correspondingly positive also, but such charge will tend to be suppressed due to the repulsion between like R. F. charges on adjacent vacuum tube structures which overall condition tends to hold the amplitude of the grid positive R. F. swing at that instant in an area below cut off.

The invention herein described as being useful is comprised therefore of designing a grid circuit at one-half the wave length of the fundamental total frequency and the tube firing on each alternate grid R. F. cycle.

We claim:

1. In a self-excited oscillator, an inductive means and a condenser capacitively coupled with the inductive means, said condenser being adapted to receive a load between its plates and whereby the inductive means and the condenser constitute a part of an output circuit, an inductance in close inductive relation with the center portion only of said inductive means, with the center of said inductive means being common with the center of said inductance, a plurality of vacuum tubes including plates and grids, said inductance being conected between the plates of the vacuum tubes and constituting a part of said self-excited oscillator in which said inductive means forms a part, and a connection between each vacuum tube grid and a point in said output circuit with each grid being connected so that the total length from the grid to the common center of said inductive means and said inductance is electrically one-eighth of a wave length of the frequency of said oscillator.

2. In a self-excited oscillator in which the vacuum tube fires for each alternate positive cycle of grid swing, an inductive means and a condenser capacitively coupled with said inductive means, said condenser being adapted to receive a load between its plates and whereby the inductive means and the condenser constitute a part of an output circuit, an inductance in close inductive relation with the center portion only of said inductive means with said inductance and said inductive means having a common center, a plurality of vacuum tubes including plates and grids with said inductance being connected between the plates of the vacuum tubes and constituting a part of the self-excited oscillator of which said inductive means forms a part, and a connection between each vacuum tube grid and a point in said output circuit, with each vacuum tube grid being connected so that the total length from the grid to the common center of said inductive means and said inductance is electrically one-eighth of a wave length of the frequency of said oscillator.

References Cited in the file of this patent

UNITED STATES PATENTS

| | | |
|---|---|---|
| 2,149,387 | Brown | Mar. 7, 1939 |
| 2,382,435 | Mann et al. | Aug. 14, 1945 |
| 2,474,420 | Himmel | June 28, 1949 |
| 2,506,158 | Mann et al. | May 2, 1950 |